Sept. 13, 1960     B. F. FAY     2,952,309
FLAMETHROWER
Filed Jan. 16, 1958
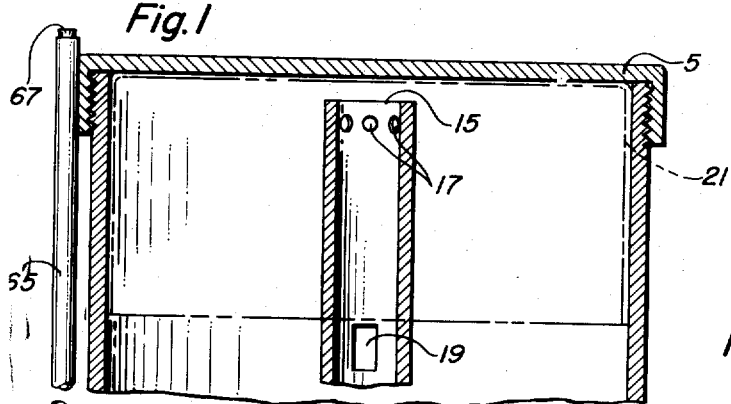
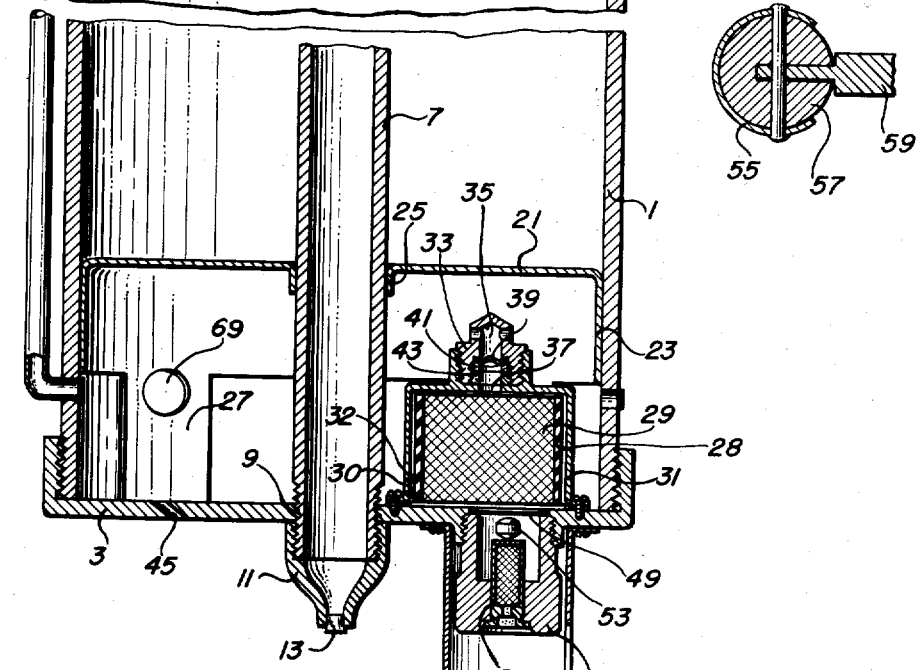
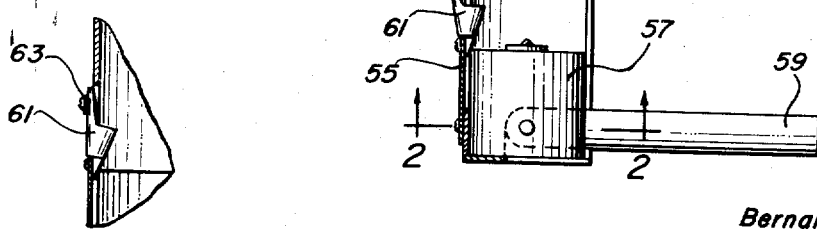
INVENTOR.
Bernard F. Fay
BY George Renehan
ATTORNEY

United States Patent Office

2,952,309
Patented Sept. 13, 1960

2,952,309

FLAMETHROWER

Bernard F. Fay, Edgewood, Md., assignor to the United States of America as represented by the Secretary of the Army Filed Jan. 16, 1958, Ser. No. 709,426

2 Claims. (Cl. 158—28)

(Granted under Title 35, U.S. Code (1952), sec. 266)

The invention herein described may be manufactured and used by or for the Government of the United States of America for governmental purposes without the payment to me of any royalty thereon.

This invention relates to a flamethrower of the "one shot" type which is so constructed as to preheat the fuel before its discharge in order to secure better ignition of the fuel and, consequently, improved range.

In the drawing; Figure 1 is a longitudinal section of my flamethrower.

Figure 2 is a section taken on line 2—2, Fig. 1.

Figure 3 is a fragmentary view of a safety catch.

The flamethrower comprises a cylinder 1 formed of aluminum or other metal and typically about five inches in diameter and three feet long. Cylinder 1 is closed at its end by first end cap 3 and second end cap 5. A central discharge tube 7 is supported by first end cap 3, being joined thereto by threads 9. Tube 7 carries a discharge nozzle 11 having an axial discharge opening which is initially closed by a plug 13. It has been found that, when gelled gasoline is used as a fuel, a nozzle of the type shown, having a reverse curve as the generatrix of its interior surface, is most efficient. It will be noted that tube 7 has an opening at its inner end 15, which is spaced from second end cap 5, forming an inlet opening. The tube may also be provided with any desired number of auxiliary inlet openings 17. It is also pierced by a gas relief opening 19, the purpose of which will be explained later.

A piston 21 extends between cylinder 1 and discharge tube 7. It comprises outer skirt 23 and inner flange 25 which are in sliding engagement with cylinder 1 and tube 7, respectively. In the modification shown in the drawing, skirt 23 carries legs 27 which position piston 21 relative to first end cap 3.

Piston 21 is actuated by a propellant charge 29. The propellant should be one which is non-detonating and slow burning. The solid rocket fuels, particularly those commonly used in so called "jet assisted take off" units are suitable. A sheath 28 of rubber or plastic aids in control of the burning.

The propellant charge 29 is enclosed in a propellant receptacle 31 which is secured to end cap 3. Propellant reciptacle 29 is provided with an exit aperture 30 which is initially closed by a thin diaphragm 32 of, say, metal foil which is secured, e.g., by cementing, to the inner surface of receptacle 29.

A safety plug 33 screws into the inner end of propellant receptacle 31. This plug has a central bore 35 which communicates with an aperture 37 in receptacle 31. Bore 35 is closed by a breakable disk 39 which is held in place by a washer 41 and clamp nut 43.

An aperture 45 in end cap 3 communicates with the interior of cylinder. It is so positioned that combustion products from propellant charge 29 will impinge on fuel issuing from nozzle 11.

Various means may be utilized for igniting propellant 29. Since this flamethrower, when used in combat, will normally be used only once and discarded, I have shown a very simple mechanism for this purpose. An igniter casing 47 is secured to first end cap 3. It communicates with the interior of propellant receptacle 31 and is preferably separated from propellant charge 29 by an easily meltable or combustible disk 49, which may be formed of a thin plastic. A blank cartridge 51 is seated in igniter casing 47 and an igniter pellet 53 is preferably held between blank cartridge 51 and disk 49.

A hammer guide 55 surrounds igniter casing 47. A hammer 57 having a pivoted handle 59 is slidably mounted in hammer guide 55. A safety catch 61 is also mounted on hammer guide 55. A swingable tab 63 is provided which can be positioned to lock safety catch 61 as shown in Fig. 3 or release it as shown in Fig. 1.

As an optional feature, I provide an anti-recoil tube 65 which communicates with the interior of casing 1 between piston 21 and first end cap 3. It extends along casing 1 and terminates in a rearwardly directed opening, initially closed by plug 67, adjacent second end cap 3. In order to guard against closure of this tube, I may provide openings 69 in legs 27 of piston 21. This feature is employed when particularly high pressures are employed. Under ordinary conditions it may be omitted.

*Operation*

Casing 1, between piston 21 and second end cap 5, and tube 7 are filled with a liquid fuel, preferably gelled gasoline.

When propellant 29 burns, the products of combustion build up pressure in receptacle 31, bursting diaphragm 32. The gases are thus admitted to the space between first end cap 3 and piston 21. This produces pressure on the liquid fuel, ejecting plug 13, followed by a stream of fuel, which is ignited by the hot gases issuing from aperture 45.

As piston 21 moves to the right, fuel is forced into tube 7 through its opening as well as through openings 17 and 19.

Since the space between piston 21 and end cap 3 is filled with hot gases the fuel is heated as it flows through tube 7, decreasing the resistance to flow in the tube and also increasing the ease of ignition.

Opening 19 is separated from second end cap 5 by a distance which is greater than the width of flange 25, so that when the piston 21 reaches its extreme position, shown in broken lines, opening 19 lies between the piston and first end cap 3. The combustion gases then escape through opening 19 and tube 7.

If the anti-recoil tube 65 is employed, gaseous products of combustion enter this tube, eject plug 67, and rush out in the direction opposite to the direction of flow of liquid fuel from nozzle 11, thus producing an opposing reaction.

To use the weapon, the operator turns tab 63 to release safety catch 61 then by means of handle 59 forceably strikes hammer 57 against blank cartridge 71. Cartridge 71 ignites pellet 53, which burns through disk 49 and ignites propellant 29. Safety catch 61 holds hammer 57 against reverse movement, in order that cartridge 51 may not be blown out by the pressure of its own combustion gases or those of propellant 29.

While I have described one embodiment of my invention in detail, it will be understood that numberous changes are possible. I therefore wish my invention to be limited solely by the scope of the appended claims.

I claim:

1. A flamethrower comprising a cylinder having a first end and a second end, a first end cap removably mounted on said first end and a closure member closing said second end, a discharge tube positioned axially within said cylinder and extending through said first end cap, and having an unobstructed bore extending substantially to said second end of said cylinder, a piston in said cylinder in sliding engagement with said cylinder and said discharge tube, a combustible propellant charge between said piston and said first end cap, and communicating with the interior of said cylinder adjacent said first end thereof, said discharge tube having an inlet opening in said cylinder adjacent said second end and an axial discharge opening outside said first end cap, means for igniting said propellant charge and including at least one opening in said first end cap so positioned as to cause a stream of combustion products of said propellent to impinge on fluid as it leaves said discharge opening, thereby igniting said fluid.

2. A flamethrower as defined in claim 1 and further comprising a tube communicating with the interior of said casing between said piston and said first end cap, said last named tube extending longitudinally of said cylinder on the exterior thereof and having an anti-recoil discharge adjacent the second end of said cylinder.

References Cited in the file of this patent

UNITED STATES PATENTS

| | | |
|---|---|---|
| 1,219,867 | Reilly | Mar. 20, 1917 |
| 1,304,710 | Seidler | May 27, 1919 |
| 1,463,518 | Thomas | July 31, 1923 |
| 2,479,570 | Hayner et al. | Aug. 23, 1948 |
| 2,515,180 | Barker | July 18, 1950 |
| 2,671,312 | Roy | Mar. 9, 1954 |